United States Patent [19]

Bigelow et al.

[11] Patent Number: 4,941,606

[45] Date of Patent: Jul. 17, 1990

[54] DEVICE TO STABILIZE A NOTCHED WEB IN A VACUUM BOX

[75] Inventors: Donald O. Bigelow, Webster; Thomas W. Palone, Rochester, both of N.Y.

[73] Assignee: Eastman Kodak Company, Rochester, N.Y.

[21] Appl. No.: 445,229

[22] Filed: Dec. 4, 1989

[51] Int. Cl.⁵ .................. B65H 20/24; G11B 15/58
[52] U.S. Cl. ................................ 226/118; 226/97; 242/182
[58] Field of Search ................ 226/97, 7, 118; 242/182, 183, 185

[56] References Cited

U.S. PATENT DOCUMENTS

| | | | |
|---|---|---|---|
| 2,927,789 | 3/1960 | Walsh et al. | 226/97 |
| 2,990,990 | 7/1961 | Wilkins et al. | 226/97 |
| 3,330,557 | 7/1967 | Young | 226/97 X |
| 3,807,612 | 4/1974 | Eggert | 226/97 X |
| 3,871,597 | 3/1975 | LaMers | 226/97 X |
| 3,883,060 | 5/1975 | Scarpa | 242/182 X |
| 3,948,425 | 4/1976 | Bala | 226/43 |
| 4,218,026 | 8/1980 | Stange | 226/118 X |
| 4,477,822 | 10/1984 | Luoma et al. | 226/118 X |
| 4,760,946 | 8/1988 | Bassa | 226/97 |

Primary Examiner—Stuart S. Levy
Assistant Examiner—Paul Thomas Bowen
Attorney, Agent, or Firm—Charles E. Snee

[57] ABSTRACT

In a conventional vacuum box a loop of a web material is received in an elongate chamber of the box, and a vacuum at the lower portion of the chamber draws air through the chamber to hold the loop of web material under tension as it moves through the chamber. When the web has one or more notches along a side edge thereof, the web may vibrate excessively and experience a drop in web tension as the notch passes through the bottom of the loop in the box. In order to avoid this problem an endless ring of flexible material is positioned in the vacuum box and within the loop of web material. The ring has a plurality of spaced openings around the circumference of the ring, and they are offset from the side edges of the ring so that the portion of the ring adjacent the openings will cover the notches in the web as the web passes through the bottom of the loop in the vacuum box, thus avoiding the excessive vibration in the web and loss in web tension mentioned above.

4 Claims, 1 Drawing Sheet

DEVICE TO STABILIZE A NOTCHED WEB IN A VACUUM BOX

BACKGROUND OF THE INVENTION

The present invention relates to the stabilization of a loop of web having notches, holes or other openings along the web as it passes through a vacuum box, and more specifically, to the provision of a flexible ring that is positioned in the loop of web material.

Vacuum boxes have long been used for applying tension to a loop of a web material, such as webs of paper or photographic film. One application of a vacuum box is along the path between a supply of web material and a station where the web material is wound onto a spool. A loop of the web material is formed in the vacuum box by applying a vacuum to the bottom of the box, and the vacuum holds the loop in the box under slight tension. The web material can be driven out the box intermttently during the spooling operation, and can be fed into the box from the web supply continuously or on an intermittent basis. It is known to provided sensors to detect the position of the bottom of the loop in the vacuum box and the shut off the drive mechanism between the supply and the vacuum box when the loop reaches a predetermined maximum size.

If the web passing through the vacuum box has one or more notches or other openings in it, the web will vibrate excessively as it passes through the box, and there will be a dramatic loss in tension in the web induced by the vacuum box when the notch passes through the bottom of the loop in the vacuum box. The vibration and the loss in tension result from a surge of air flowing through the notch. Such vibrations and the change in web tension are most undesirable and can adversely effect operations downstream of the vacuum box.

U.S. Pat. No. 3,871,597, issued Mar. 18, 1975 in the name of H. LaMers, relates to a labeling apparatus that uses a web carrying a plurality of labels. A loop of the web is formed in a chamber, and vacuum is applied to the chamber to draw the web into a supply loop in the chamber. A curtain in the chamber maintains the web in the loop configuration. The curtain is described as comprising an thin flexible material, such as a 0.005 inch thick sheet of nylon, which is drawn by the vacuum and presses against the web to maintain it as a loop. One end of the curtain is fixed to a post while the opposite end is free and in constant engagement with the web. The web is prepared with die cuts on the border of each label area to be formed to facilitate separation of the labels from the rest of the web. Each label area is defined by a plurality of cuts which forms a closed loop that encircles the label area. The areas at the edges of the web and outside the label areas have sprocket holes that are spaced along the length of the web. The curtain is apparently imperforate and is described as sealing the web area where cuts are made that form the label and sprocket areas. The curtain is designed to fill out the full width of the supply chamber when the web is narrower than the chamber, and in addition, it is an opaque material which can be used to interrupt a light beam used for detecting and controlling the size of the loop in the chamber.

U.S. Pat. No. 3,807,612 issued Apr. 30, 1974 in the name of R. H. Eggert relates to a web feeding apparatus for a blank making machine. The Eggert patent discloses a vacuum box in which the size of the loop of web material in the box is sensed by a series of lamps and related photo cells. As stated in column 10 of the patent, when the web material is transparent the loop control system may be inefficient, inprecise or ineffective. In order to avoid this problem an opaque shade of thin flexible material is suspended inside the loop of web material. One end of the shade is secured to a rod and the other end is free to move into engagement with the web loop. The shade need only be wide enough to eclispe the photocells from the lamps and hence can have a maximum width that is only somewhat less than the narrowest strip of the web material that is to be drawn into the vacuum box. The length of the shade is adequate to reach the bottom of the loop when the loop is enlarged enough the receive light from the lowermost photocell of the system. The differential air pressure across the loop causes the shade to substantially conform to the interior surface of the loop.

The curtain or shade in the patented devices discussed above are both fixed to a rod or the like at one end and, as a result, there is relative motion between the web and the curtain or shade. This relative motion can effect scratching of the web. In addition, the fact that one end of the curtain or shade is secured to a rod may prevent the use of such devices in vacuum boxes where the size of the loop of the web in the box varies significantly during rapid intermittent advancement of a long strip of web out of the box, as in a film or paper winding operation. Also, the curtain or shade extends not only to the loop area of the web, but also through the area where the web enters and leaves the vacuum box. Such can complicate threading of the web into the vacuum box. In addition, as the curtain or shade of the prior devices is moved up or down with the loop in the web, the tension exerted by the curtain or shade appears to increase and decrease, thus resulting in a constantly varying tension on the web. This conflicts with an important result desired for a vacuum box, i.e. that it be effective to maintain a substantially constant tension on the web in the box.

SUMMARY OF THE INVENTION

It is an object of the invention to avoid excessive vibrations in a notched web as it is advanced through a vacuum box. Another object of the invention is to avoid uneven tension forces on a loop of web in a vacuum box that may be induced by a curtain or shade, as discussed above, while sealing notches or openings in the web loop. A still further object of the invention is to preserve the low inertia effect of a vacuum box on web tension as the web is advanced through the box. A further object of the invention is to avoid excessive vibrations of a notched web in a vacuum box, while minimizing or eliminating scratching of the web or introducing uneven tension forces directly onto the web such as may be caused by curtains, shades or the like of the prior art.

In accordance with the invention a device is provided to stabilize a web with one or more notches or other openings in the web as the web passes through a vacuum box. The box has walls defining an elongate chamber for receiving a loop of the web. The chamber has an opening through which the web enters and leaves the chamber. Vacuum means spaced from the opening draws air through the chamber so that the loop of web is held under tension in the chamber. The device comprising an endless ring of flexible material having a plurality of vent holes extending through the ring and spaced from each other. The holes are offset from one side edge of the ring. The ring is positionable within the loop of the web and the ring is freely rotated by the web in response to movement of the web through the chamber. The portion of the ring between the holes and the one side edge of the ring is imperforate and covers the notch or other opening in the web as it passes the ring so air is not drawn through the notch or opening as it passes the ring.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 2:
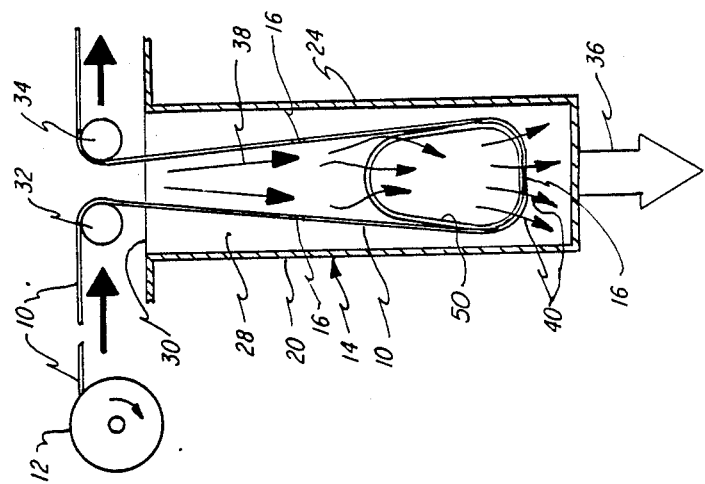
FIG. 2 is a vertical cross section view of the vacuum box and stabilizing device of the invention.

The stabilizing device of the invention can be used with webs of various types, including webs of paper or photographic film. For example, the device can be used with a paper web 10 delivered from a supply roll 12 initially to a vacuum box generally designated 14 and then to a spooling machine (not shown) at the downstream side of the vacuum box. The large arrows at the top of FIG. 2 show the direction of movement of the web into and out of the box 14. A paper web 10 conventionally furnished to a spooling machine has a plurality of notches 16 located along a side edge of the web in spaced relation to each other. At the spooling machine the paper web is wound onto a spool along with a strip of photographic film. Rolls of film and paper web of this kind are well known and include, for example, size 120 photographic film. While the following description refers specifically to notches in an edge of a web, it will be understood that the invention is applicable to webs having openings of various types in other locations.

Figure 1:
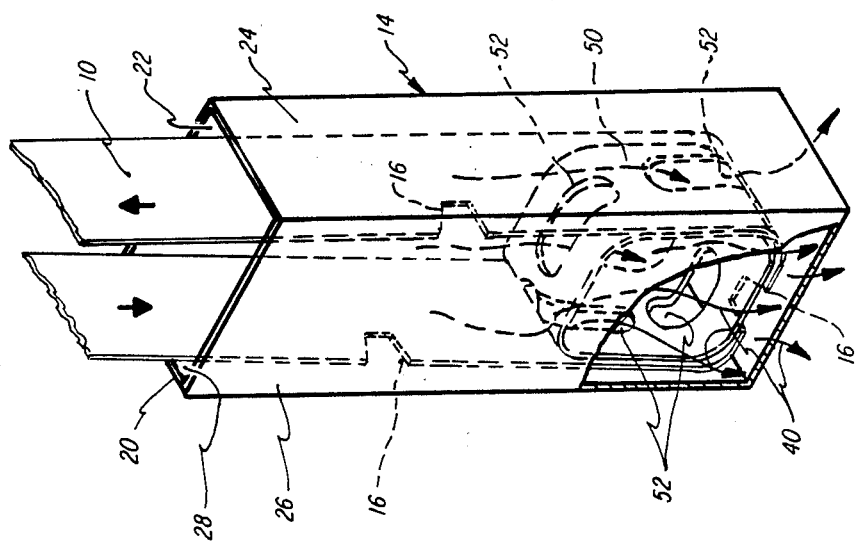
FIG. 1 is a perspective view of a conventional vacuum box incorporating a stabilizing device of the present invention.

The vacuum box 12 can be of any known construction. For example, it includes four walls 20, 22, 24 and 26 which together define an elongate chamber 28 for receiving a loop of the web 10 as illustrated in FIGS. 1 and 2. Chamber 28 has an opening 30 at the top through which the web enters and leaves the chamber. The web can be guided into and out of the chamber by guide members 32, 34 which can comprise rollers air bars or other known guiding apparatus.

Located at the bottom of the vacuum box is a suitable vacuum system, shown diagrammatically at 36 in FIG. 2, for drawing air through the opening 30 at the top of the chamber 28 and discharging it through the bottom of the chamber. The air flow through opening 30 is illustrated by the arrows 38 and is primarily through the space between the guide members 32, 34 and into the upper part of the loop of web in the box 14. As shown by arrows 40, the air can travel around the side edges of the web 10 and between the web and walls 22, 26 before it is discharged from the bottom of the vacuum box. The space between the walls 22, 26 of the vacuum box is slightly greater than the width of the web 10, and as the air flows through the chamber 28 it places the web 10 under a slight tension. Vacuum boxes of this kind are well known and need not be described in more detail here.

In a vacuum box as described hereinbefore the flow of air is essentially in a vertical direction from the opening 30 at the top of the box and downwardly through the vacuum means 36 at the bottom of the chamber 28. When a notch 16 in the web 10 reaches the bottom of the loop of the web in the box, the resistance to air flow decreases rapidly and significantly, and this is accompanied by a dramatic decrease in the tension of the web induced by the air flow through the vacuum box. This dramatic change in the web tension can adversely effect operations on the web both downstream and upstream from the guide members 32, 34. For example, it can adversely effect the winding of the web onto a spool at a winding station downstream from the vacuum box. In addition, the sudden change in pressure of the air together with the dramatic loss in web tension causes the web 10 to vibrate excessively in the vacuum box, and this too is undesirable and should be avoided.

In order to avoid dramatic loss in web tension and excessive vibration of the web when the notch 16 passes through the bottom of the loop in the vacuum box, an endless ring 50 is placed in the loop of web material 10 in the vacuum box. The ring has a plurality of vent openings 52 through the central portion of the ring to enable air passing through chamber 28 to flow through the openings. The openings can take various shapes, including a plurality of oblong holes, as illustrated, which extend around the circumference of the ring in spaced relation to each other and offset from the side edges of the ring.

The ring can be fabricated from a flat rectangular strip of material. The ends of the strip of material are cut so taht the ends can be butted and secured together to form a smooth splice. The ends can be glued together with an adhesive, or held together by an adhesive tape applied over the abutting ends of the strip. The ring is substantially cylindrical in shape before it is inserted into the vacuum box. The ring also can be cast or extruded or drawn into an endless ring shape.

Ring 50 can be made from various kinds of flexible, imperforate material. By way of example, the ring can be made from a rectangular strip of polyester material which has been extruded through a die and stretched in two directions to cross link molecules of the polyester material. A material of this kind is manufactured by the Eastman Kodak Company of Rochester, New York, and sold under the trademark Estar. Materials of this kind are used as a film base for some photographic films. The ring material selected for use needs to be one which provides some stiffness or beam strength so that the ring will not collapse but maintain a generally cylindrical or oblong shape even after the holes 52 are provided in the ring and when it is subjected to pressure from web 10 in the vacuum box. Factors to be considered for selecting a material used for the ring include the material thickness, the stiffness of the material, its beam strength, and the size and location of the holes 52 relative to each other and relative to the side edges of the ring.

The width of the ring preferably is equal to or slightly smaller than the width of the web 10. The ring also is slightly narrower than the width of the vacuum box 14 between walls 22 and 26 so that the ring does not contact the walls and become misaligned with the web 10.

For purposes of clarity in the drawing, FIG. 2 shows the loop of web 10 spaced from walls 20, 24 of the vacuum box. In practice, the portions of the web near the loop bottom are very close to walls 20, 24. The points nearest the walls are referred to as the tangent points. It is desirable that the combined area of the openings in the ring be greater than the orifice area of the vacuum box. The orifice area comprises the area between the side walls of the vacuum box and the loop of web 10 from the tangent points downwardly to the bottom of the web loop. Also, holes 52 should be located in the ring so that they do not become aligned with the notches or openings 16 in the web. Thus holes 52 may need to be nearer to one side edge of the ring than the other side edge thereof, depending on the size and location of the notches.

Ring 50 can be inserted into the vacuum box by deforming it slightly and manually placing it between the guide members 32, 34 after the loop of web material 10 has been formed in the vacuum box. The presence of the ring at this position will cause it to be sucked downwardly into the loop of the web in the vacuum box due to the air flow through the box established by the vacuum means 36. The ring will always be in contact with the inner surface of the web 10 and can constantly flex and bend to maintain a shape corresponding to the loop of the web in the vacuum box. The flow of air through the vacuum box keeps the ring in contact with the loop portion of the web at the bottom of the box, and movement of the web causes the ring to rotate counter clockwise (as viewed in the drawings) within the loop. Because the ring is not secured to a rod or other part of the apparatus, it is free-floating and can move up and down in the box with the bottom of the web loop without significantly changing the tension applied to the web by the vacuum means. Because the ring is driven by and moves with the web, there is essentially no relative movement between the ring and web which would cause scratching of the web.

The holes 52 in the ring enable air to flow without interruption through the vacuum box entrance 30, between the portions of the web forming the loop and through the holes 52 in the ring until it is discharged along the path designated 40. As the notches 16 pass through the loop of web material in the bottom of the vacuum box, the notches are covered by the portion of the ring between the holes 52 and the side edge of the ring. As a result the web does not experience any significant decrease in tension when the notch passes through the vacuum box and there is no related vibration of the web as is typically encountered in vacuum boxes without a ring 50.

Vibrations may be present in the loop of web material even when the loop is free of notches as shown as 16, but such vibrations greatly increase when notches are present, as explained before. These vibrations are dampened by the ring firmly contacting the loop of the web in response to air flow through the ring. By dampening the vibrations, a substantially constant tension is obtained in the web both upstream and downstream of the vacuum box.

The invention has been described in detail with particular reference be understood that variations and modifications can be effected within the spirit and scope of the invention.

We claim:

1. A device to stabilize a web with one or more openings, such as notches along the web as the web passes through a vacuum box, the box having walls defining an elongate chamber for receiving a loop of the web, the chamber having an opening through which the web enters and leaves the chamber, and vacuum means spaced from the opening for drawing air through the chamber so that the loop of web is held under tension in the chamber, the device comprising:

an endless ring of flexible material, the ring having a plurality of vent holes extending through the ring and spaced from each other, the holes being positionable within the loop of the web and being unattached to the vacuum box so that the ring is freely rotatable by the web in response to movement of the web through the chamber, the ring having an imperforate portion covering the opening in the web as the opening passes the ring so air is not drawn through the opening by the vacuum means as the opening passes the ring.

2. A device as set forth in claim 1 wherein the width of the ring is equal to or slightly narrower than the web, and the ring has sufficient beam strength to press outwardly against the loop of the web and prevent the collapse of the ring within the loop of the web.

3. A device as set forth in claim 1 wherein the loop of web in the box is substantially tangent to the box walls at two points, and the box has an orifice area comprising the area between the walls of the box and the loop of web from the tangent points to the bottom of the loop of web, and the combined area of the holes in the ring is greater than the orifice area.

4. A device to stabilize a web with one or more notches along a side edge of the web as the web passes through a vacuum box, the box having walls defining an elongate chamber for receiving a loop of the web, the chamber having an opening at the top through which the web enters and leaves the chamber, and vacuum means spaced from the opening for drawing air through the chamber so that the loop of web is held under tension in the chamber, the device cmprising:

an endless flexible ring having a plurality of elongate vent holes extending through a central portion of the ring, the holes being spaced from each other around the circumference of the ring and being offset from side edges of the ring, the ring being loosely positioned within the loop of the web and engageable by the web so that the ring is freely rotatable by the web in response to movement of the web through the chamber, the ring being made of an imperforate material having sufficient stiffness so that the ring will maintain a generally cylindrical or oblong shape when it is subject to pressure from web loop in the box, the ring being equal to or slightly narrower than the web, and the portion of the ring between the holes and one of the side edges of the ring covering the notch in the web as the notch passes the ring so air is not drawn through the notch as the notch passes the ring.

* * * * *